3,133,857
SYNERGISTIC FUMIGANT COMPOSITION AND METHOD
Arthur W. Swezey, Garden Grove, Calif., assignor to The Dow Chemical Company, Midland, Mich., a corporation of Delaware
No Drawing. Filed Nov. 29, 1956, Ser. No. 624,969
7 Claims. (Cl. 167—39)

The present invention relates to the improvement of soils and crops and is particularly concerned with a new agronomic practice and composition for improving the ability of soil to support plant growth.

It is an object of the present invention to provide a new agronomic practice and composition for improving the plant growing properties of soil and the ability of soil to support the growth of crops. Another object is the provision of a new method and composition for improving the emergence, seedling growth and the harvest of crop plants. A further object is the provision of a new method and composition for treating soil to obtain improved controls of soil dwelling invertebrate organisms such as wire-worms and nematodes. An additional object is the provision of a new method and composition for treating soil which will accomplish the stimulation of the growth of crops. Other objects will become apparent from the following specification and claims.

The new agronomic practice comprises treating soil or growth media with a composition comprising from about 1 to 2 parts by volume of 1,2-dibromoethane in admixture with from about 3 to 9 parts by volume of 1,3-dichloropropene to improve the ability of the soil to support plant growth and to benefit the plants grown in the treated soil. Such practice protects the plants from the ravages of soil-dwelling nematodes which attack their roots and improves the growth and harvest of crop plants. It has also been found that the treatment accomplishes changes in the soil which stimulate the growth and improve the growth characteristics of crops grown therein. It is among the advantages of the present invention that crops planted in fields treated with these compositions show much larger yields than the yields obtained when either of the constituents is used separately. It is a further advantage that the very desirable results as regards crop yields and plant stimulation are obtained with reduced amounts of 1,2-dibromoethane and 1,3-dichloropropene. An additional advantage is that these reduced effective dosages of the mixture of toxicants have materially reduced the hazard of soil residues. Thus, the practice of the present invention provides a very desirable economic advantage for the agriculturalist.

In carrying out the invention, the dibromoethane and dichloropropene components of the compositions may be mixed together and employed directly for the treatment of soil. Alternatively, the components may be employed in admixture with a fumigant carrier. Thus, the components may be dissolved together in a suitable liquid carrier to provide compositions adapted to be distributed in soil. Similarly, the dibromoethane and dichloropropene may be dispersed together on or in a granular or finely divided solid carrier. In a further mode of operation, the 1,2-dibromoethane and 1,3-dichloropropene may be blended with a suitable surface-active dispersing agent with or without one or more of the aforementioned liquid carriers to provide an emulsifiable concentrate suitable for dispersion in water so that the composition may be applied in aqueous dispersion or emulsion form.

1,3-dichloropropene exists in two stereoisomeric forms: the cis-isomer and the trans-isomer. The usual commercially available 1,3-dichloropropene consists of a mixture of said isomers. In the present specification and claims, unless otherwise specified, the expression, "1,3-dichloropropene," refers to such a mixture of isomers.

The compositions of the invention may be prepared in any suitable fashion. Since the dibromoethane and dichloropropene compounds are miscible in all proportions, compositions without carriers may be prepared by simple mixing of the components at ordinary temperatures. In the preparation of compositions containing a liquid organic carrier, the dibromoethane and dichloropropene components and the liquid organic carrier are thoroughly mixed at ordinary temperatures. Suitable liquid organic carriers include liquid aliphatic and aromatic hydrocarbons such as toluene, xylenes, naphthas and hydrocarbon mixtures derived from the distillation of petroleum or coal, halohydrocarbons such as carbon tetrachloride, ethylene or propylene dichloride, methylene chloride and the like, and lower aliphatic alcohols and ketones. In general, it is preferred to avoid liquid carriers having such low flash points as to constitute a fire hazard or such high boiling points as to leave undesired residues in the soil after use of the compositions. Other ingredients, such as corrosion inhibitors, can be incorporated in the compositions if desired.

In a preferred embodiment of the invention, selected petroleum distillates are employed as liquid carriers. The petroleum distillates used in such embodiment are carefully fractionated portions boiling almost entirely under 400° F. at atmospheric pressure and having a flash point above about 80° F. These fumigant compositions are characterized by having excellent penetrating properties and by being of low fire hazard to the shipper and user.

In the preparation of emulsifiable compositions, the dibromoethane and dichloropropene components are mixed together in the proportions set forth above, together with a surface-active dispersing agent, soluble in the composition, with or without the further addition of a liquid organic carrier as previously described. Suitable surface-active dispersing agents include polyoxyalkylene derivatives of alcohols, phenols and organic acids, oil-soluble petroleum sulfonates, polyoxyethylene hexitan esters, polyoxyethylene derivatives of glycerol, glycols, or amines and the like.

In compositions in which the dibromoethene and dichloropropene components are dispersed on or in a granulated or finely divided solid carrier, said components may be added directly to the solid carrier with mechanical mixing. Alternatively, the components may be combined with one or more of the aforementioned liquid organic carriers and the resulting compositions admixed with the solid carrier. Suitable solid carriers include diatomaceous earth, kaolin clay, silica gel, activated alumina, exploded mica, wood flour, nut-shell flour, chopped sugarcane bagasse and the like.

In formulating the compositions, it is essential to maintain the proportions of from about 1 to 2 parts by volume of 1,2-dibromoethane to from about 3 to 9 parts by volume of 1,3-dichloropropene and to provide an effective amount of said mixture in the finished composition. In liquid compositions, good results are obtained when employing from about 5 to 98 percent of the above mixture of active ingredients, the remainder of the composition being one or more of the aforementioned liquid organic carriers and/or surface-active dispersing agents. In compositions wherein the active mixture is dispersed on a solid carrier, it is generally desirable to employ from about 2 to about 30 percent by weight of the above mixture of active ingredients in the finished solid composition, although with high capacity carriers such as silica gel and exploded mica the active ingredients may amount to 50 percent by weight or more of the solid composition. In any case, it is desirable to employ sufficient of the solid carrier so that the liquid composition is adsorbed or absorbed to provide a free-flowing solid mixture.

When carrying out the invention, the compositions may be distributed in soil in any suitable fashion. With liquid compositions, good results have been obtained by depositing the active fumigant mixture at regular intervals beneath the surface of the soil. Such deposition may be accomplished readily by automatic machinery or by hand-operated apparatus. Thus, the active composition may be sprayed or otherwise deposited in a furrow which is subsequently closed to keep the active agents in the desired zone of the soil to be treated. Alternatively, the liquid compositions may be injected into the soil at predetermined intervals. In any case, the active composition is usually deposited at a depth of from about 4 to 24 inches below the soil surface.

In row treatments, it is advantageous to place the fumigant composition at least 12 inches below the surface of the seedbed and to seal in the fumigant by listing the soil or by other suitable means such as ring rollers or press sealers attached behind the applicator. In overall application with chisel type applicators, the fumigant composition may be applied in uniform streams 1 to 12 inches apart at a depth of 6 to 8 inches. With plow-sole applications, it is desirable to employ about 8 inches spacing between furrows and to spray or otherwise introduce the fumigant composition so as to cover the bottom of the furrow. Where injection of the active composition at intervals is employed, good results are obtained when injecting at intervals of from 3 to about 12 inches, although somewhat greater intervals may be employed in certain cases. In the above operations it is desirable to apply the fumigant composition after the soil has been worked into seedbed condition and when the soil temperature is above 50° F. and the soil moisture content is sufficient for seed germination.

In yet another mode of operation, the fumigant composition in emulsifiable form may be dispersed in water employed to irrigate the soil. In this method, the amount of water may be varied in accordance with the porosity and water holding capacity of the soil in order to obtain the desired depth of distribution of the toxicant mixture.

The amounts of the dibromoethane-dichloropropene composition to be employed will vary depending upon such factors as the type and condition of the soil, the varieties and growth stages of soil pests to be controlled and the particular crop to be planted thereafter. The essential criterion is to employ an amount effective for accomplishing the desired growth stimulation and improved harvest of the subsequently planted crop. Good results are obtained when distributing from about 4 to 8 gallons of the active dibromoethane-dichloropropene mixture per acre in row treatments and at least about 12 gallons per acre in overall applications. This corresponds to from about 41 to 82 pounds or more of the composition per acre distributed through the upper 4 to 16 inches of the soil. Where compositions embodying a liquid or solid carrier are used, the amount of composition is adjusted to distribute substantially the above described amounts of the active dibromoethane-dichloropropene mixture per acre of soil.

When operating in accordance with the invention, it is generally desirable to allow at least about 10 days after application of the active compostiion before planting the treated area to a crop. During such period, the fumigant composition, after accomplishing its desired effects, is dissipated from the soil by processes such as leaching, volatilization and chemical degradation. If high dosages of the active composition are employed or if the temperature remains below about 60° C. or the soil is sealed by heavy rains or irrigation, a somewhat longer waiting period is desirable before planting. When employing high dosages or following periods of low temperature or high soil moisture, it is sometimes desirable to work the soil by harrowing or tilling several days before planting in order to facilitate the dissipation of the fumigant composition from the soil.

The following examples illustrate the invention but are not to be construed as limiting:

*Example 1*

The following formulation is prepared by mixing the ingredients at room temperature.

| Ingredient: | Parts by weight |
| --- | --- |
| 1,2-dibromoethane | 830 |
| Petroleum distillate | 82 |
| Corrosion and freezing inhibitor | 88 |

The petroleum distillate employed is a fraction commonly known as Stoddard solvent and has a boiling range of from 325° to 400° F. and a flash point of greater than 100° F.

One part by volume of the above formulation is mixed with 5 parts by volume of 1,3-dichloropropene to produce a composition adapted to be employed for the treatment of soil to improve its plant growing properties.

*Example 2*

An emulsifiable composition is prepared by mechanically mixing the following.

| Ingredient: | Parts by weight |
| --- | --- |
| Toxicant mixture | 45.7 |
| Atlox A–1045 | 5.2 |
| Xylene | 49.1 |

The toxicant mixture employed in the above emulsifiable composition is the 1,2-dibromoethane-1,3-dichloropropene composition of Example 1. Atlox A–1045 is a surface-active dispersing agent identified as a polyoxyethylene sorbitol oleate-laurate.

*Example 3*

Two parts by volume of 1,2-dibromoethane is mixed with 3 parts by volume of 1,3-dichloropropene. The resulting mixture is added with stirring to fine granular silica gel in the proportions of 1 part by weight of the toxicant mixture to 3 parts by weight of silica gel to provide a solid composition adapted to be distributed in soil to benefit the growth and harvest of crop plants.

*Example 4*

One part by volume of 1,2-dibromoethane is mixed with 9 parts by volume of 1,3-dichloropropene. The resulting mixture is stirred into finely divided kaolin clay in the proportions of 1 part by weight of the toxicant mixture to 19 parts by weight of clay. The resulting mixture is milled through a hammer-mill employing a small proportion of crushed solid carbon dioxide in the feed to prevent overheating. The milled product is a free-flowing finely-divided composition adapted to be dusted on the soil and worked in by standard cultivating practices.

*Example 5*

One part by volume of 1,2-dibromoethane and 5 parts by volme of 1,3-dichloropropene are dissolved together in 6 parts by volume of petroleum naphtha, having a boiling range of 250° F. to 400° F. and a flash point of above 80° F., to provide a liquid composition adapted for soil application by spraying or injection.

*Example 6*

The composition of Example 2 is dispersed in water to prepare an aqueous emulsion containing 4 pounds of the toxicant mixture per hundred gallons of aqueous emulsion. This emulsion composition is sprayed on the soil and promptly worked in prior to planting to control nematodes and wire worms and to improve emergence, seedling growth and crop yields.

Example 7

The following composition, adapted to be distributed in soil to improve its ability to support plant growth, was prepared by mechanically mixing the ingredients.

| Ingredient: | Parts by weight |
|---|---|
| cis-1,3-dichloropropene | 38.0 |
| Trans-1,3-dichloropropene | 33.3 |
| 2,3-dichloropropene | 1.8 |
| 3,3-dichloropropene | 3.1 |
| 1,2-dichloropropenes | 3.3 |
| 1,2-bromoethane | 18.7 |
| Stoddard solvent | 1.8 |

This composition had a specific gravity of 1.31 at 68°/68° F. and a flash point of above 80° F. (Cleveland open cup method). The proportions of 1,2-dibromoethane to 1,3-dichloropropene were about 1 to 5 by volume.

The compositions of the invention are particularly useful in controlling soil-dwelling pests and accomplishing improved crop yields when distributed in the soil from 10 days to several weeks prior to the planting of crops such as lima beans, sweet potatoes, tobacco, pineapples, cotton, carrots, sugar beets and the like.

I claim:

1. A fumigant composition comprising from about 1 to 2 parts by volume of 1,2-dibromoethane and from about 3 to 9 parts by volume of 1,3-dichloropropene.

2. A fumigant composition which comprises from about 1 to 2 parts by volume of 1,2-dibromoethane and from about 3 to 9 parts by volume of 1,3-dichloropropene in admixture with a fumigant carrier.

3. An emulsifiable composition which comprises from about 1 to 2 parts by volume of 1,2-dibromoethane and from about 3 to 9 parts by volume of 1,3-dichloropropene and a surface-active dispersing agent adapted to facilitate the emulsification of the active mixture in water.

4. A composition which comprises from about 1 to 2 parts by volume of 1,2-dibromoethane and from about 3 to 9 parts by volume of 1,3-dichloropropene in admixture with a liquid organic carrier.

5. A composition according to claim 4 wherein the liquid carrier is a petroleum distillate boiling almost entirely under 400° F. at atmospheric pressure and having a flash point above about 80° F.

6. An agronomical practice for the control of nematodes which comprises distributing in soil a composition consisting essentially of from about 1 to 2 parts by volume of 1,2-dibromoethane and from about 3 to 9 parts by volume of 1,3-dichloropropene in the amount of at least 4 gallons per acre.

7. A method according to claim 6 wherein the composition is applied in the amount of from about 41 to 82 pounds per acre distributed through the upper 4 to 16 inches of the soil.

References Cited in the file of this patent

UNITED STATES PATENTS

| | | |
|---|---|---|
| 2,415,251 | Leavitt | Feb. 4, 1947 |
| 2,421,507 | Jones | June 3, 1947 |
| 2,435,204 | Davidson | Feb. 3, 1948 |
| 2,448,265 | Kogy et al. | Aug. 31, 1948 |
| 2,473,984 | Bickerton | June 21, 1949 |
| 2,502,244 | Carter | Mar. 28, 1950 |
| 2,543,580 | Kay | Feb. 27, 1951 |
| 2,704,246 | Goodhue et al. | Mar. 15, 1955 |